US009217866B2

(12) United States Patent
Scales (10) Patent No.: US 9,217,866 B2
(45) Date of Patent: Dec. 22, 2015

(54) COMPUTER CONTROL WITH HEADS-UP DISPLAY

(75) Inventor: John Richard Scales, Huntsville, AL (US)

(73) Assignee: Science Applications International Corporation, McLean, VA (US)

( * ) Notice: Subject to any disclaimer, the term of this patent is extended or adjusted under 35 U.S.C. 154(b) by 2264 days.

(21) Appl. No.: 12/172,619

(22) Filed: Jul. 14, 2008

(65) Prior Publication Data

US 2010/0007580 A1 Jan. 14, 2010

(51) Int. Cl.
*G02B 27/01* (2006.01)
*F41G 3/16* (2006.01)

(52) U.S. Cl.
CPC ............... *G02B 27/01* (2013.01); *F41G 3/165* (2013.01); *G02B 27/0189* (2013.01); *G02B 2027/0187* (2013.01)

(58) Field of Classification Search
USPC .................. 345/156–184, 7–9; 340/901–905; 359/630–633; 348/115; 341/20–35; 463/1–3, 49–57; 700/83; 715/856–861
See application file for complete search history.

(56) References Cited

U.S. PATENT DOCUMENTS

| | | | |
|---|---|---|---|
| 4,994,794 A * | 2/1991 | Price et al. ......................... 345/7 |
| 6,899,539 B1 * | 5/2005 | Stallman et al. ................. 434/11 |
| 6,963,800 B1 | 11/2005 | Milbert |
| 7,002,551 B2 | 2/2006 | Azuma et al. |
| 2004/0021950 A1 * | 2/2004 | Norton ........................... 359/631 |
| 2005/0130739 A1 * | 6/2005 | Argentar ........................... 463/36 |
| 2006/0116814 A1 | 6/2006 | Milbert |
| 2006/0121993 A1 | 6/2006 | Scales et al. |

OTHER PUBLICATIONS

Oxford English Dictionary, "cursor" entry in www.oed.com, Second Edition (1989).*
National Defense Magazine, Can the Army Make Objective Force Warrior Work?, <http://www.nationaldefensemagazine.org/articl.cfm?id=1173>, Aug. 2003.
Yeh, Michelle, et al., "Effects of Frame of Reference and Viewing Condition on Attentional Issues with Helmet Mounted Displays", Technical Report, Jan. 1998, pp. 1-75.
Livingston, Mark A., et al., "Evaluating System Capabilities and User Performance in the Battlefield Augmented Reality System", published in Proc. NIST/DARPA Workshop on Performance Metrics for Intelligent Systems, Gaithersburg, MD, Aug. 24-26, 2004.
"Competitive Analysis: Ground Guidance", downloaded from <http://www.primordial.com> on Dec. 11, 2006, 9 pages.
"Whitepaper: Ground Guidance", downloaded from <http://www.primordial.com> on Dec. 11, 2006, 15 pages.

(Continued)

*Primary Examiner* — Liliana Cerullo
(74) *Attorney, Agent, or Firm* — Banner & Witcoff, Ltd.

(57) ABSTRACT

A method, computer-readable medium and apparatus are described for providing a user interface control for use with a manipulable object, such as a weapon. As the object is moved, images from a video camera are projected into a heads-up display. A user of the object may activate a user interface control by pressing a button on the object, causing an image of a user interface control to be projected into the heads-up display. Movement of the object may cause a cursor to be moved across the heads-up display, allowing the user to select user interface features without removing hands from the object. Pressing a button may cause a mouse click command to be generated, allowing the user to type or perform other functions.

3 Claims, 8 Drawing Sheets

(56) References Cited

OTHER PUBLICATIONS

"Primordial Soldier: Vision System for Soldiers", Product Sheet, downloaded from <http://www.primordial.com> on Dec. 11, 2006, 2 pages.

Primordial Soldier: Geographically-Enabled Augmented Reality System for Dismounted Soldiers (A05-119), Presentation, downloaded from <http://www.primordial.com> on Dec. 11, 2006, 35 pages.

"Primordial Soldier User manual", downloaded from <http://www.primordial.com> on Dec. 11, 2006, 28 pages.

"Primordial Soldier, Vision system software for soldiers", downloaded from <http://www.primordial.com> on Dec. 11, 2006, 6 pages.

"Competitive Analysis: Unit Detection, Differentiating friend from foe and assessing threats in a soldier's head-mounted display", downloaded from <http://www.primordial.com> on Dec. 11, 2006, 8 pages.

"Whitepaper: Unit Detection, Differentiating friend from foe and assessing threats in a soldier's head-mounted display", downloaded from <http://www.primordial.com> on Dec. 11, 2006, 16 pages.

"Commander's Digital Assistance (CDA)", General Dynamics C4, downloaded from <http://www.defense-update.com> on Dec. 11, 2006, 3 pages.

Web pages regarding AN/PVS-21, STS Sensor Technology Systems, downloaded from <http://www.sts-eo.com> on Jan. 11, 2007, 9 pages.

Marty Whitford, "Friend or Foe?, FBCB2 Enhances Battle Planning, Reduces 'Friendly Fire'", GPS World, Feb. 1, 2005, downloaded from <http://www.gpsworld.com/gpsworld> on Dec. 11, 2006, 10 pages.

InterSense InertiaCube3 and IC3 Processor, Intersense, downloaded from <http://www.intersense.com> prior to Feb. 28, 2007, 1 page.

Eric Foxlin, Chapter 7: Motion Tracking Requirements and Technologies, Handbook of Virtual Environment Technology, InterSense Inc., downloaded from <http://www.intersense.com> prior to Feb. 28, 2007, 54 pages.

Walrath, James D., "Information Technology for the Soldier: The Human Factor," Army Research Laboratory (ARL-TR-3525), May 2005, 18 pages.

U.S. Patent Application and Drawings for U.S. Appl. No. 11/000,934, filed Dec. 2, 2004.

U.S. Patent Application and Drawings for U.S. Appl. No. 11/680,207, filed Feb. 28, 2007.

Quantum3D, Inc., Daggers: Embedded Training for Dismounted Soldiers Scients and Technology Objective (STO), <http://www.quantum3d.com/PDF/sstories/SStories_Daggers.pdf>, 2004. The year of publication is sufficiently earlier than the effective U.S. filing date and any foreign priorty date so that the particular month of publication is not in issue.

Sensor Technology Systems, Inc., Model 2733 Low Profile / Night Vision Google: AN/PVS-21: Operational Summary, 2004. The year of publication is sufficiently earlier than the effective U.S. filing date and any foreign priority date so that the particular month of publication is not in issue.

Hicks, Jeffrey, et al., "Eyekon: distributed Augmented Reality for Solider Teams", published in 21st Century Systems, Inc., 2001-2003, pp. 1-14. The year of publication is sufficiently earlier than the effective U.S. filing date and any foreign priority date so that the particular month of publication is not in issue.

* cited by examiner

COMPUTER CONTROL WITH HEADS-UP DISPLAY

BACKGROUND

Computer-assisted weapons, such as those used for assisting in targeting a weapon, are well known. In one such system, described in published U.S. patent application number US2006/0121993, entitled "System and Method for Video Image Registration in a Heads Up Display," hereby incorporated by reference, a video camera is coupled via a computer to a heads-up display. A computer positions images from the video camera on the heads-up display based on the relative orientations of the video camera and the display. As the video camera moves with respect to the display, the images are repositioned within the heads-up display. The video image may come from a weapon sight aligned with the heads-up display so that the user can easily view the camera image without having to shift focus from the larger scene.

Figure 1:
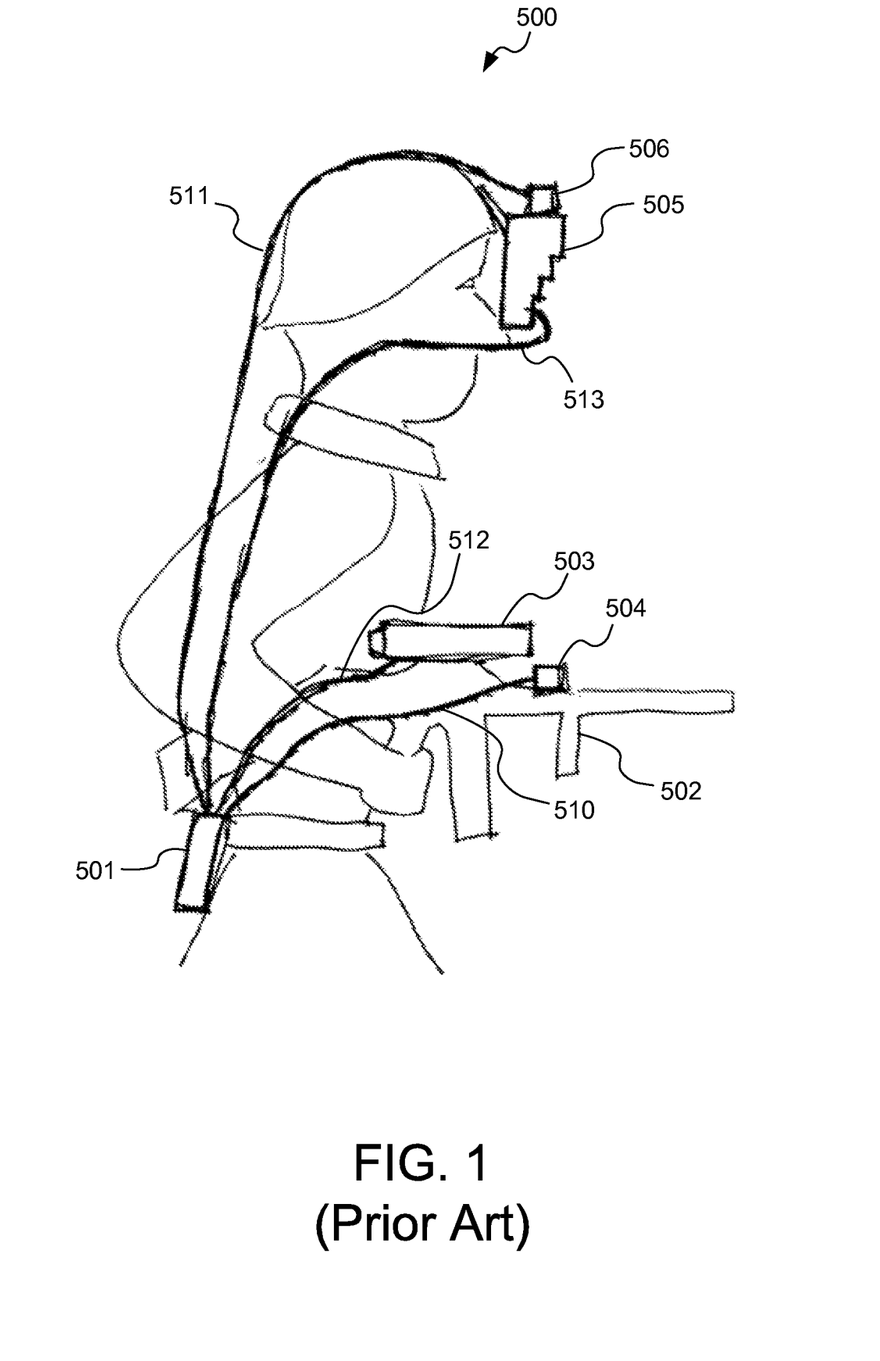
FIG. 1 illustrates a known weapon system that produces a video feed overlaid on a field of view.

FIG. 1 (taken from the aforementioned published patent application) shows a system wherein a soldier 500 is fitted with goggles 505, a rifle 502 with video gun sight 503, and field computer 501. The goggles 505 may produce a visual field for the user to see in front of him. The video gun sight 503 produces a video feed, including cross hairs, depicting the line of sight of the rifle 502. The video weapon sight 503 may produce a magnified view, a thermal view, a night vision view, an image intensifier view, or some combination thereof.

Computer 501 receives a video feed from video weapon sight 503 via cable 512. The field computer 501 receives sensor data from orientation sensors 504 and 506, via cables 510 and 511. Once the video feed is processed, field computer 501 delivers video for the heads up display within the goggles 505 via cable 513.

The sensor 504 affixed to rifle 502 sends data relaying the orientation of the weapon and attached video gun sight 503. This data may include angular pitch, yaw, and roll information, sent in frequent intervals. The sensor 506 affixed to goggles 505 relays similar orientation data, except that it reports on the line of sight of the goggles instead of the rifle 502. Sensor 504 need not be directly affixed to the rifle 502, so long as it moves with the rifle. For example, it could be attached to the gun sight 503. Likewise, sensor 506 need not be directly affixed to the goggles 505. The sensor 506 could also be attached to the helmet of the soldier 500. Instead of cables, wireless communication may be used between any or all of the various components.

Figure 2:
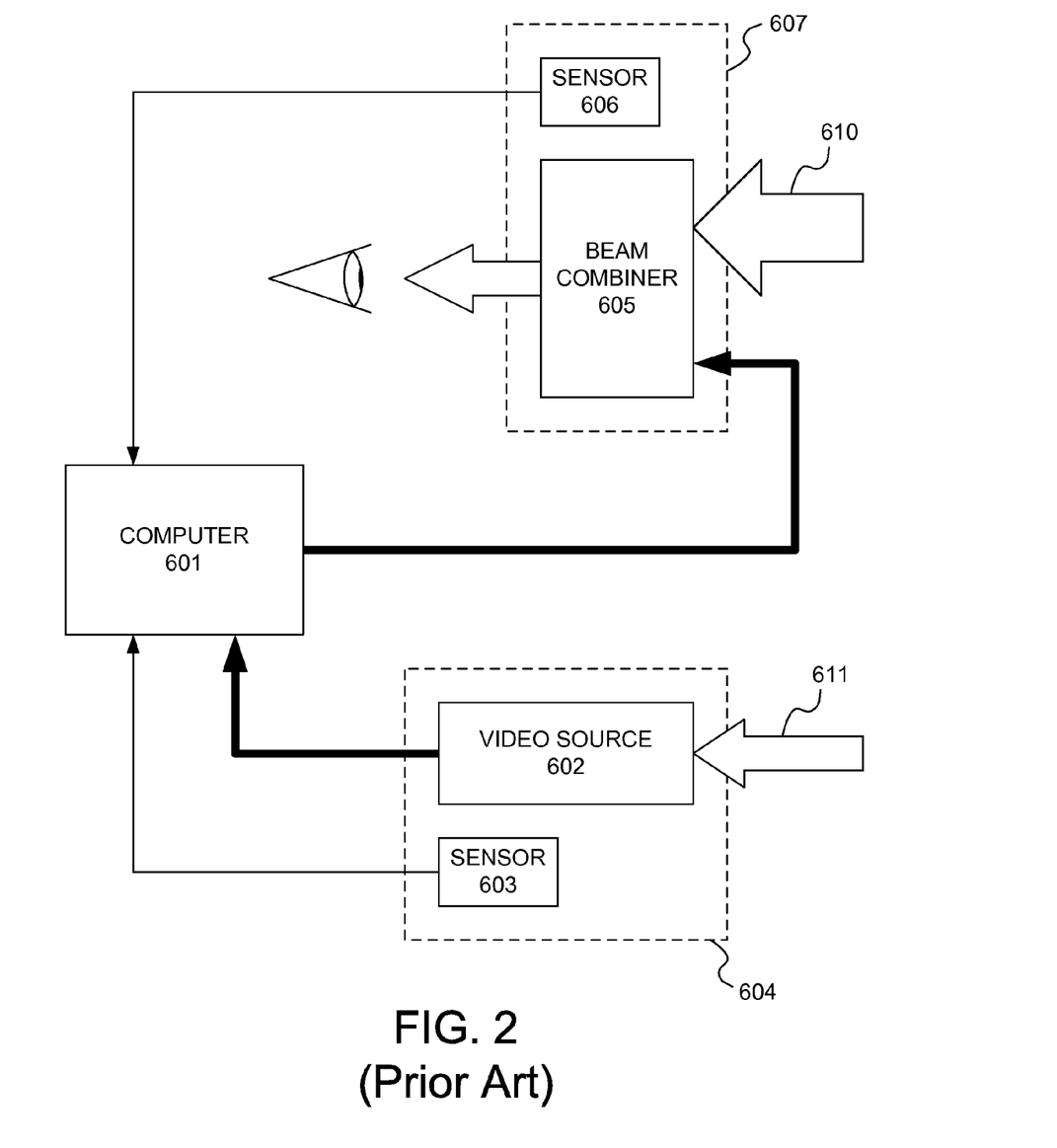
FIG. 2 illustrates a known system for producing a video feed overlay on a field of view of the type shown in FIG. 1.

FIG. 2 (taken from the aforementioned published patent application) is a block diagram which depicts functional components of a system of the type shown in FIG. 1. Computer 601 receives sensor data and a video feed from video assembly 604, along with sensor data from heads up display assembly 607. Video assembly 604 is composed of video source 602 and sensor 603 affixed to detect the orientation of the video source. Video source 602 has a visual field 611 from which it receives light and converts it to the video signal delivered to computer 601. Heads up display assembly 607 is composed of beam combiner 605 and sensor 606 affixed to detect the orientation of the beam combiner.

Beam combiner 605 has a visual field 610, whose image is combined with the processed video signal delivered from computer 601. This combination of video signal with visual field may be created through the use of a transparent display, such as a piece of glass set at an angle. The glass may pass light from the visual field 610 to the observer while simultaneously reflecting light from a video display strategically placed based on the angle of the glass. The transparent display need not be perfectly transparent, but also might be translucent allowing only some light to pass through. The video output of computer 601 is placed in front of the visual field 610, creating what is sometimes referred to as a heads up display or HUD. Such displays allow an observer to receive information or images while simultaneously viewing a visual field, preventing the observer from having to look away.

Figure 3:
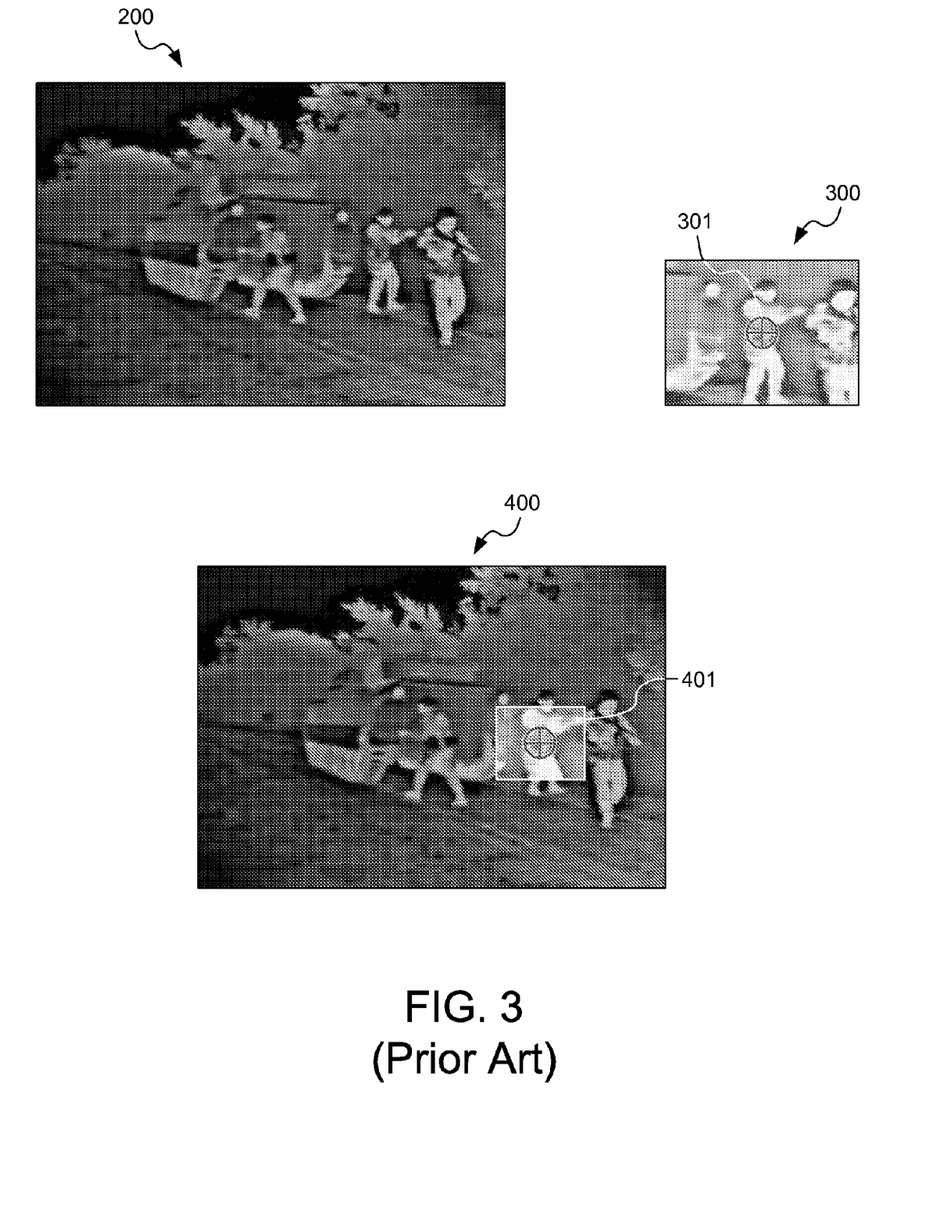
FIG. 3 shows a video feed image 300 overlaid on a normal field of view 200 to produce an enhanced image 400 according to a known system.

FIG. 3 (also taken from the aforementioned published patent application) shows how the field of view through the goggles can be combined with a visual feed from a video camera aligned with the weapon sight. Image 200 represents the visual field through a normal set of goggles without any enhancement. Image 300 represents the visual field (including a target crosshair 301) from the video camera capturing the same scene (or a portion of the same scene) as visual field 200. Visual field 400, here the view through a soldier's night vision goggles or other (clear) goggles, is enhanced with the addition of a portion of the weapon sight video feed 401 through the use of a heads up display (HUD) projected to one eye of the wearer. Video feed 401 may be modified so as to discard unneeded visual information, cropping the image to perhaps one quarter of its original size. In addition, the video feed 401 has been positioned over the portion of the visual field 400 based on the direction the video source is pointed. As the weapon moves, the video feed 401 is dynamically positioned within the visual field 400. Ultimately, by superimposing the two images, a soldier with a heads up display and a weapon mounted video camera is able to simultaneously survey a setting, acquire a target, and point his weapon at the target without taking time to shift from goggles to weapon sight.

Although not shown in FIG. 1, the known system of FIG. 1 also includes a switch plate comprising a plurality of buttons affixed to weapon 502, allowing the soldier to perform certain limited functions. The known assigned button functions include: (1) power on/off, (2) a video source select, permitting the soldier to select daylight video or thermal weapon sight; (3) a heads-up display brightness control, allowing the soldier to toggle brightness through various levels; (4) a calibration switch permitting calibration of the inertial measurement units; (5) a mode switch that toggles between modes including a power-up mode, a full-screen mode, a calibration mode, and a standby mode; and (6) a spare (unused) function.

It would be desirable to permit a soldier to perform more sophisticated control functions related to computer manipulation, such as for controlling a cursor on a computer screen, while allowing the soldier to maintain control of the weapon or other manipulable object.

SUMMARY

Various embodiments provide a mode wherein a cursor may be generated and manipulated through the combination of one or more switches attached to a weapon (or other object of manipulation) and the user's movement of the weapon or other object. When pressed, a switch mounted to the weapon causes the heads-up display to show a computer screen including a cursor. As the weapon is moved, the cursor moves on the screen based on the signals from the weapon's movement sensor (e.g., inertial measurement unit or IMU). Pressing a second switch acts as a mouse click, selecting the action under the cursor (e.g., a pull-down menu option or a button-press type selector). Pressing the first switch again returns the computer screen to warm standby, allowing the user to perform non-computer functions when necessary. The principles described herein may be used not only for weapons but for computer games and other applications.

DETAILED DESCRIPTION

Figure 4:
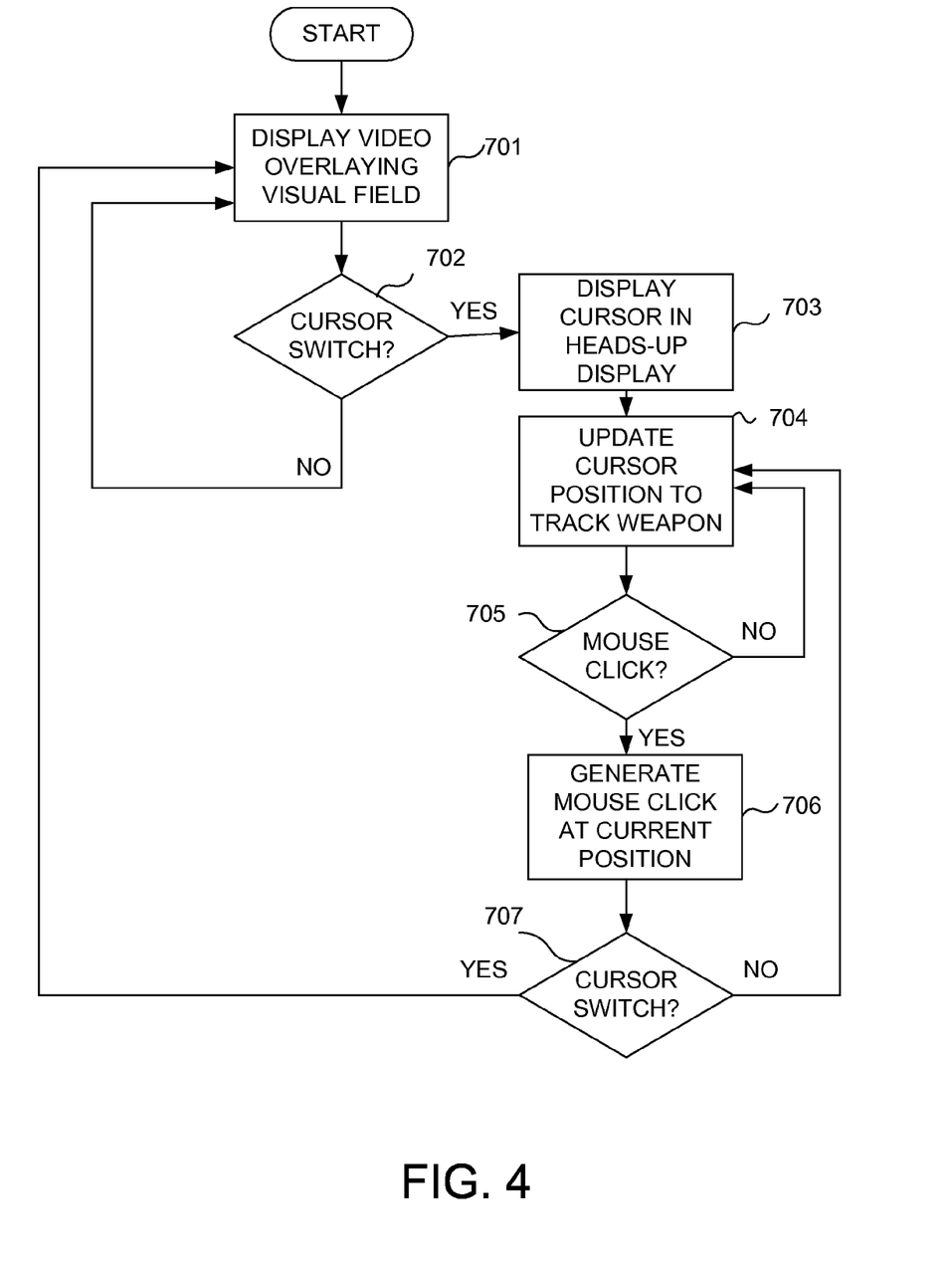
FIG. 4 shows a method including steps according to various embodiments of the invention.

Various exemplary embodiments of the invention will now be described with reference to FIGS. 4 through 8. FIG. 4 shows method steps that may be carried out while practicing certain embodiments of the invention, and FIGS. 5 through 8 illustrate various structural features as well as a visual depiction of what a user would see.

Figure 5:
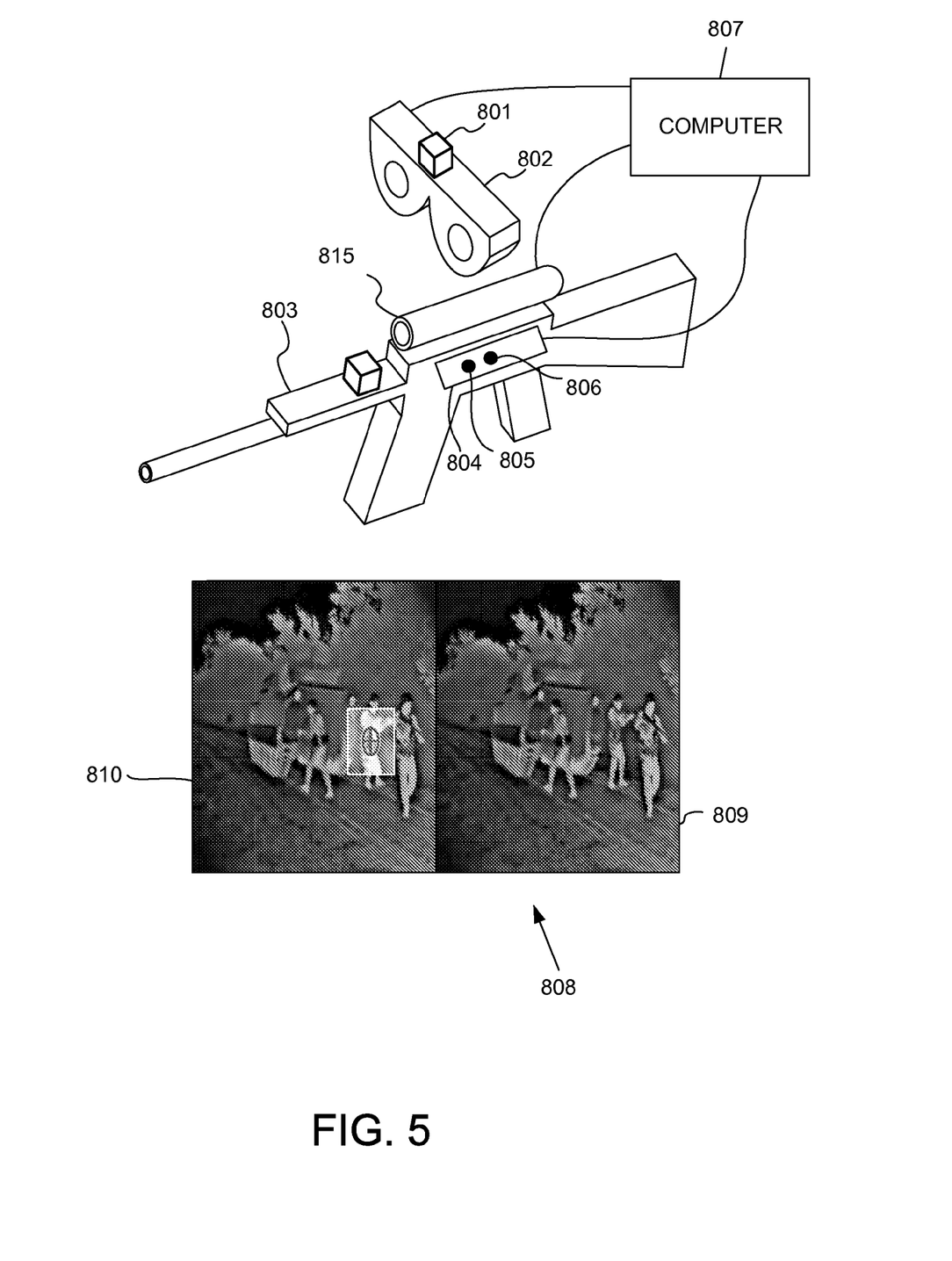
FIG. 5 shows a weapon-mountable switch plate that is operable to control cursor functions according to various embodiments of the invention.

Turning first to FIG. 5, a weapon 803 has mounted thereon a video camera 815 coupled to a computer 807. An associated heads-up display 802 includes a pair of goggles having an associated beamsplitter (not shown) that allows the user to see a portion of the video image from video camera 815 superimposed over the normal field of view. Either one or both eyepieces may be outfitted with a beamsplitter, such that the heads-up display is projected into one or both eyes of the wearer. The use of beamsplitters to project images for heads-up displays is illustrated, for example, in U.S. Pat. No. 5,648,789. In the embodiment of FIG. 5, a single projection is generated, in this example projected to the left eye. As shown in FIG. 5, left image 810 includes the projected video portion and right image 809 contains no projection, so the user sees a normal field of view through the goggles.

According to one variation of the invention, a switch plate 804 is also attached to the weapon and comprises a plurality of buttons or switches 805 and 806 that are operatively coupled to computer 807. As the user holds the weapon and sees through goggles 802 with the projected display, the user is also able to manipulate buttons 804 and 805 without losing grip on the weapon. Although two buttons are shown in FIG. 5, more buttons or fewer buttons (e.g., a single button) may be used in accordance with variations of the invention. Furthermore, the position of the switch plate may be varied. For example, the switch plate may be positioned on a side portion of the weapon, a top portion of the weapon, or a combination of the two (i.e., a flanged plate including buttons some on the top and some on an angled side of the plate).

According to one variation of the invention, one button may be assigned to a cursor switch function such that when it is pressed, it activates a cursor function. The other button may be assigned to a mouse click function such that when it is pressed it performs the function of a mouse click.

Alternatively, the same button may be assigned to both functions in certain embodiments, such that repeated activation of the same button toggles between modes and switching functions, or holding the button down for a period of time activates cursor mode and thereafter activation of the button constitutes a cursor press. The terms "button" and "switch" should be understood to include any of various user-input controls including switches, keys, dials, knobs, pressure plates, capacitance detectors, and the like.

Turning to FIG. 4, in step 701 during normal operation the video feed image is displayed to the wearer in one or both eyes, overlaying the normal field of view of the goggle wearer. In step 702, computer 807 checks to determine whether the user has pressed the cursor switch button, indicating that computer control functions are desired. If not, the process continues in step 701, and the functions described in previously-published U.S. patent application 2006/0121993 are provided.

Figure 6:
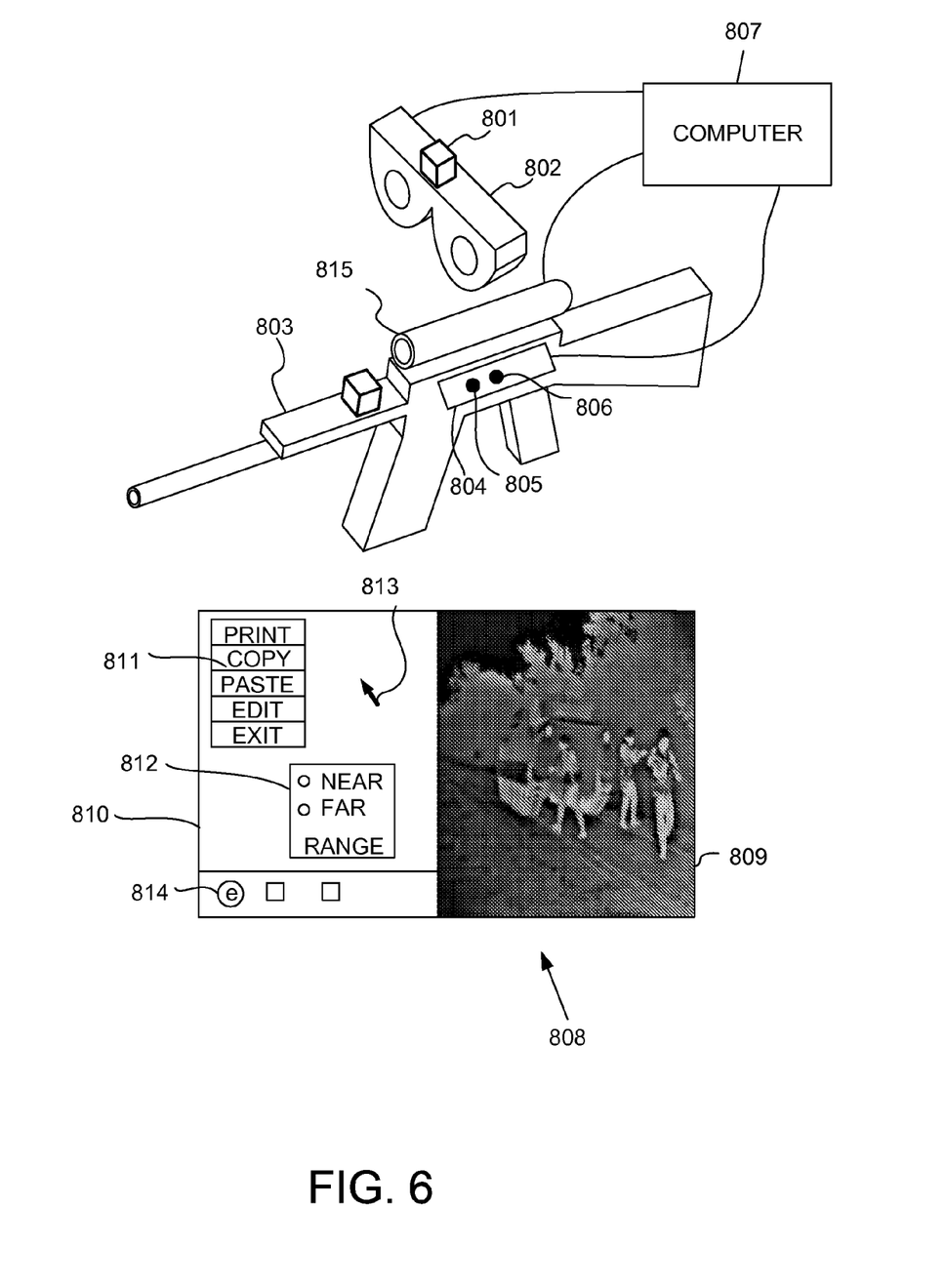
FIG. 6 shows a first view including a computer control view 810 having a cursor 813.

If in step 702 it is detected that the user has pressed the cursor switch (e.g., one of the buttons 805 or 806 on switch plate 804) then processing moves to step 703, wherein a cursor mode is displayed in one of the eyepieces to the user. This is shown in FIG. 6, in which one of the projected images 810 is replaced with a computer display including such computer control functions as a pull-down menu 811, a dialog/selector box 812, icons 814, and a cursor 813. Any of various computer control functions may be displayed on screen image 810 and the inventive concepts are not limited to those displayed. The other image 809 continues to permit the wearer to see a normal field of view, or it may alternatively provide a second heads-up display such as providing all or a portion of the video feed, allowing the user to simultaneously see both computer control functions and the video image feed. The cursor mode image 810 may comprise a full screen (i.e., all or substantially all of the user's field of view) in order to provide more space for the user to work. Although not visible in FIG. 6, in one variation the cursor mode image 810 is essentially translucent, such that the user can see through the projected image at a normal field of view through the goggles while simultaneously being able to view the computer control elements depicted in FIG. 6.

Figure 7:
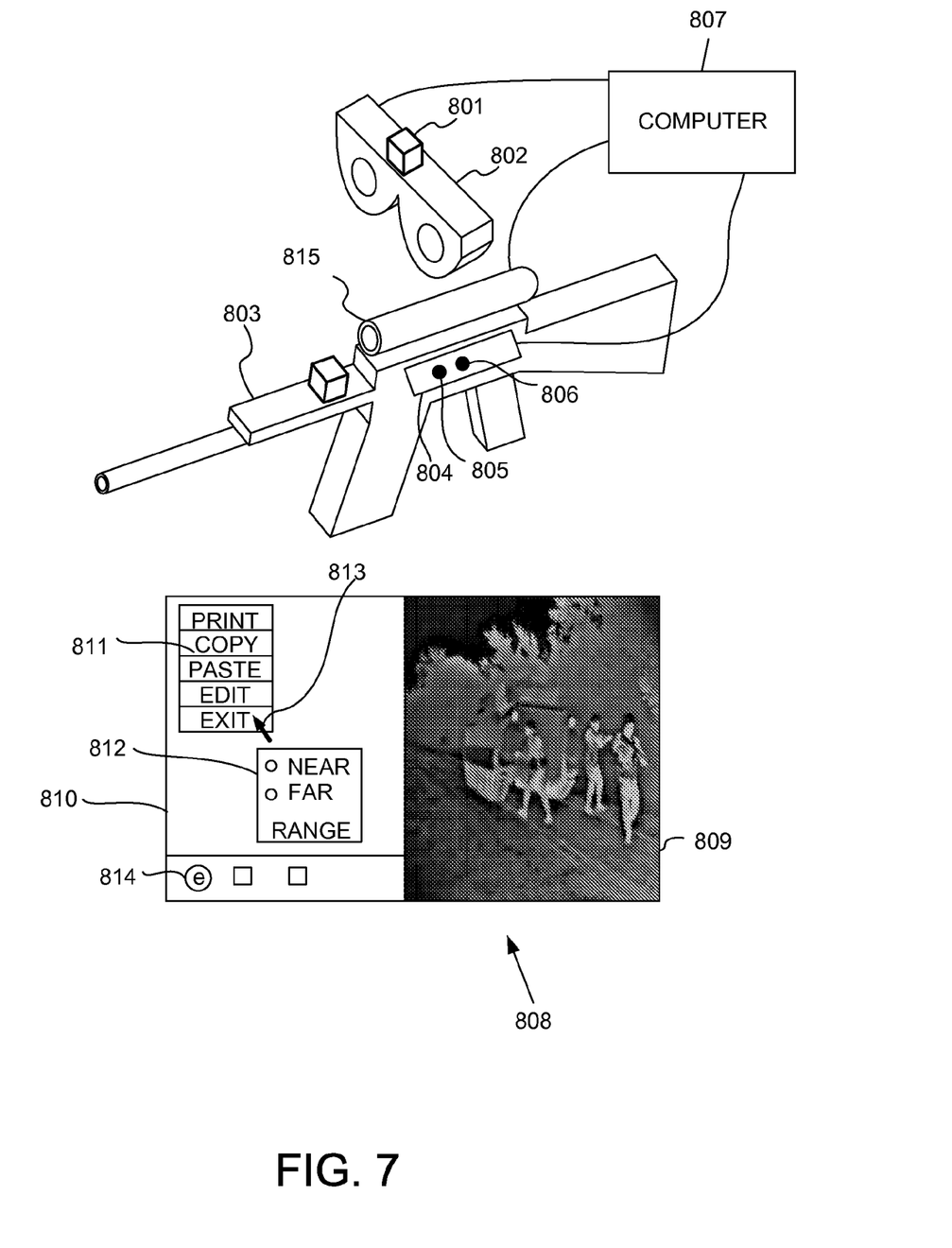
FIG. 7 shows a second view wherein the computer control view 810 shows a moved cursor position 813.

In step 704, as the user moves the weapon, the cursor position is updated to generally track the movement of the weapon. In general, computer 807 receives measurement data regarding the movement of the weapon (as described and illustrated in previously-published U.S. patent application 2006/0121993) and, in response thereto, moves cursor 813 on the screen to permit the user to move the cursor to a desired location. The cursor movement may occur in any of various ways. For example, if the user moves the weapon slightly to the left, computer 807 may move the cursor a corresponding distance to the left on the screen, as illustrated in FIG. 7. In FIG. 7, the user has moved the weapon slightly to the left, and computer 807 has moved cursor 813 left toward pull-down menu 811, allowing the user to indicate selection of one of the menu items. (The directional mapping is not critical—a movement to the right may instead be mapped to a leftward movement of the cursor on the screen). If the user moves the weapon slightly up or down, the cursor moves accordingly up or down on the heads-up display.

Figure 8:
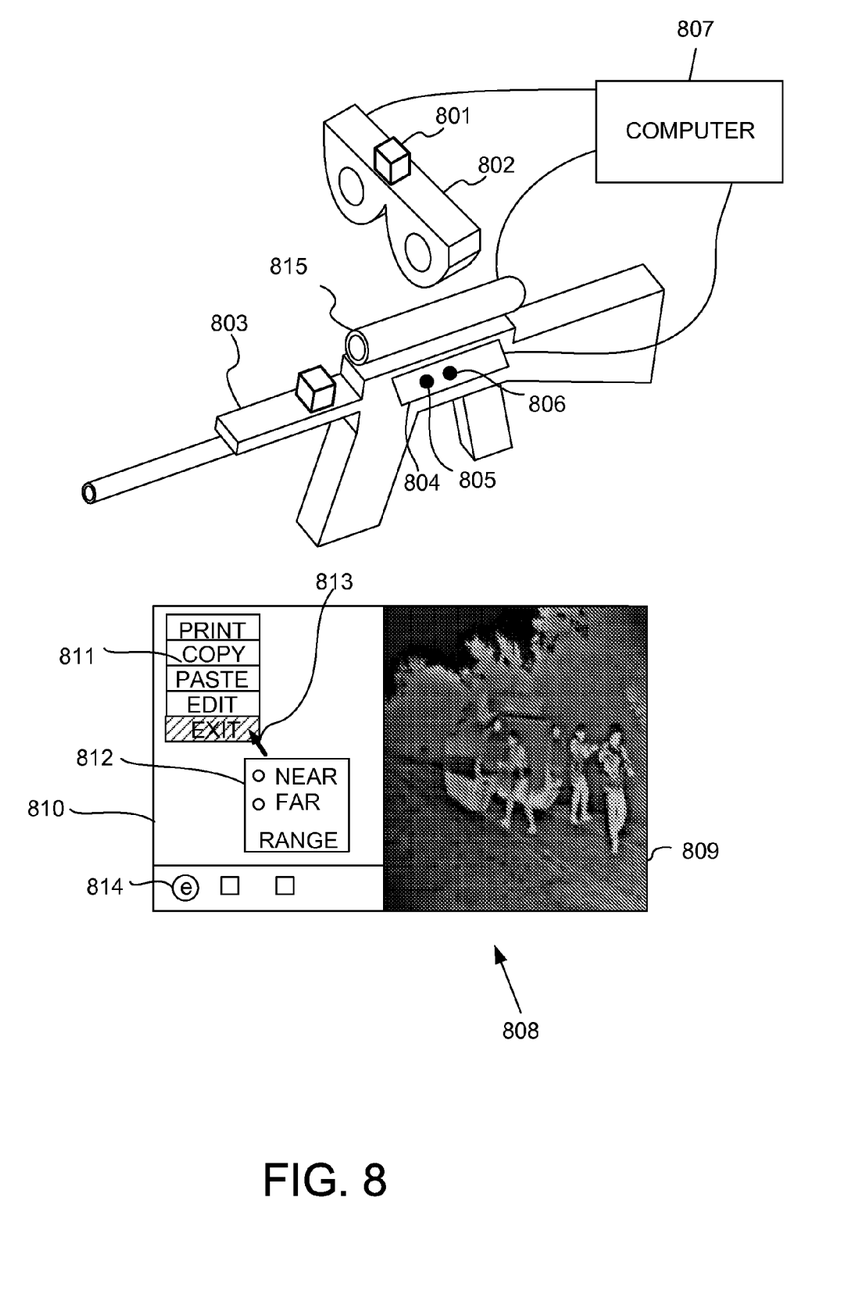
FIG. 8 shows a third view wherein the computer control view 800 shows a selected cursor function 813.

Returning to FIG. 4, in step 704 the cursor position is continually updated to reflect movement of the weapon, allowing the user to essentially move the cursor around on the computer screen. In step 705, computer 807 checks to determine whether the user has pressed the mouse click button. If not, the process returns to step 704 and the cursor continues to track movement of the weapon. If in step 705 the user has pressed the mouse click button, then in step 706 the computer generates a mouse click command at the current cursor location. This may cause, for example, selection of a menu item, selection of a button, simulated typing on a virtual keyboard, etc. As shown in FIG. 8, for example, the user has moved the weapon to position the cursor over one of the menu options and then pressed the cursor click button, activating the selected menu item.

In step 707 computer 807 checks to determine whether the user has pressed the cursor switch, indicating the end of the computer function mode. If the cursor switch button was not pressed, the process returns to step 704 and the cursor position continues to track movement of the weapon. If the user pressed the cursor switch again, the process returns to step 701, and the computer control functionality terminates, causing the user to see the video image in one or both eyes.

Instead of a split-screen display, the computer functions may be projected in superposition in both left and right eyes in a fluorescent color or other visually noticeable manner.

Any or all of the method steps described herein may be embodied in one or more computer-readable media (e.g., a disk, memory, or other storage device) for execution by a processor such as computer 807. The inventive principles are not limited to use with a weapon but may be mounted to any user-manipulable object such as a computer game piece, sporting equipment, tool, or other device. However, the term "object" should not be interpreted to cover a mere computer mouse itself—i.e., a computer mouse coupled to a computer with a heads-up display would not constitute a manipulable "object" as used herein.

Various elements of the system described herein may be sold as a "kit" that can be used to upgrade an existing weapon or other object. The kit may comprise, for example, a heads-up display; a switch plate configured to be mounted to a weapon and including at least one switch; a computer configured to receive input from the switch plate and from one or more position sensors, and to output a video image into a field of view of the heads-up display; and a memory storing instructions that, when executed by the computer, perform steps including causing a video image to be superimposed into a field of view of the heads-up display; detecting activation of one of the switches on the switch plate and, in response thereto, generating an image of a computer control function in the heads-up display; generating a cursor on the image of the computer control function; and causing the cursor to move in response to movement sensed from the one or more position sensors.

The term "heads-up display" includes eyeglasses, goggles, a helmet, or other wearable device that provides a field of view and a surface onto which an image may be projected, such that the wearer is able to simultaneously view both the field of view and the projected information. The term "mounted on" includes both direct and indirect coupling, and allows for the inclusion of intermediary elements such as brackets, adapters or the like. The term "video image" includes any of various types of motion-based electronic images such as a daylight video feed, a thermal image, or other type of motion-based imagery whether in analog or digital form.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

The invention claimed is:

1. A weapon system comprising:
   a weapon having mounted thereon at least one switch, a video camera, and a measurement device configured to output signals indicative of movement of the weapon;
   a heads-up display providing a field of view and configured to project a first image into a first eye of a wearer; and
   a computer programmed with executable instructions that, when executed by the computer, perform:
      outputting the first image to the heads-up display;
      detecting activation of the at least one switch and, in response thereto, replacing the first image with an image of a computer control function including a cursor;
      detecting movement of the weapon from the measurement device; and
      causing the cursor to move on the image of the computer control function in response to movement of the weapon.

2. The weapon system of claim 1, wherein the executable instructions further perform:
   detecting activation of a second switch mounted on the weapon and, in response thereto, generating a mouse click command.

3. The weapon system of claim 2, wherein the executable instructions further perform:
   detecting a second activation of the first switch and, in response thereto, removing the image of the computer control function from the heads-up display.

* * * * *